United States Patent
Hama

(10) Patent No.: US 8,180,993 B2
(45) Date of Patent: May 15, 2012

(54) INFORMATION PROCESSING APPARATUS AND CONTROL METHOD THEREOF

(75) Inventor: Mikio Hama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 910 days.

(21) Appl. No.: 12/212,296

(22) Filed: Sep. 17, 2008

(65) Prior Publication Data

US 2009/0100442 A1    Apr. 16, 2009

(30) Foreign Application Priority Data

Oct. 10, 2007 (JP) ................. 2007-264971

(51) Int. Cl.
*G06F 12/00* (2006.01)

(52) U.S. Cl. ........ 711/173; 711/170; 718/104; 719/319; 719/320

(58) Field of Classification Search .................. 711/170, 711/173; 718/102, 103, 104, 105, 107, 108; 719/319, 312, 320, 321, 327, 328
See application file for complete search history.

(56) References Cited

U.S. PATENT DOCUMENTS

| | | | |
|---|---|---|---|
| 6,711,605 B2 | 3/2004 | Sekiguchi et al. | 718/100 |
| 6,718,482 B2 | 4/2004 | Sato et al. | 714/4 |
| 6,772,419 B1 | 8/2004 | Sekiguchi et al. | 719/319 |
| 6,996,828 B1 | 2/2006 | Kimura et al. | 719/319 |
| 2004/0237086 A1 | 11/2004 | Sekiguchi et al. | 718/100 |
| 2007/0022258 A1* | 1/2007 | Panabaker et al. | 711/149 |
| 2007/0220246 A1* | 9/2007 | Powell et al. | 713/2 |

FOREIGN PATENT DOCUMENTS

JP    2007-35066    2/2007

* cited by examiner

*Primary Examiner* — Jared Rutz
*Assistant Examiner* — Gurtej Bansal
(74) *Attorney, Agent, or Firm* — Fitzpatrick, Cella, Harper & Scinto

(57) ABSTRACT

An information processing apparatus includes a CPU-A which starts a first OS stored in a DRAM-A, a CPU-B which starts a second OS stored in a non-volatile memory, and an HDD which stores a first program executed on the first OS and a second program executed on the second OS, in which CPU-A loads the second program from the HDD into DRAM-A when starting the first OS, and CPU-B makes the second OS execute the second program loaded in DRAM-A, once the first OS is started.

14 Claims, 14 Drawing Sheets

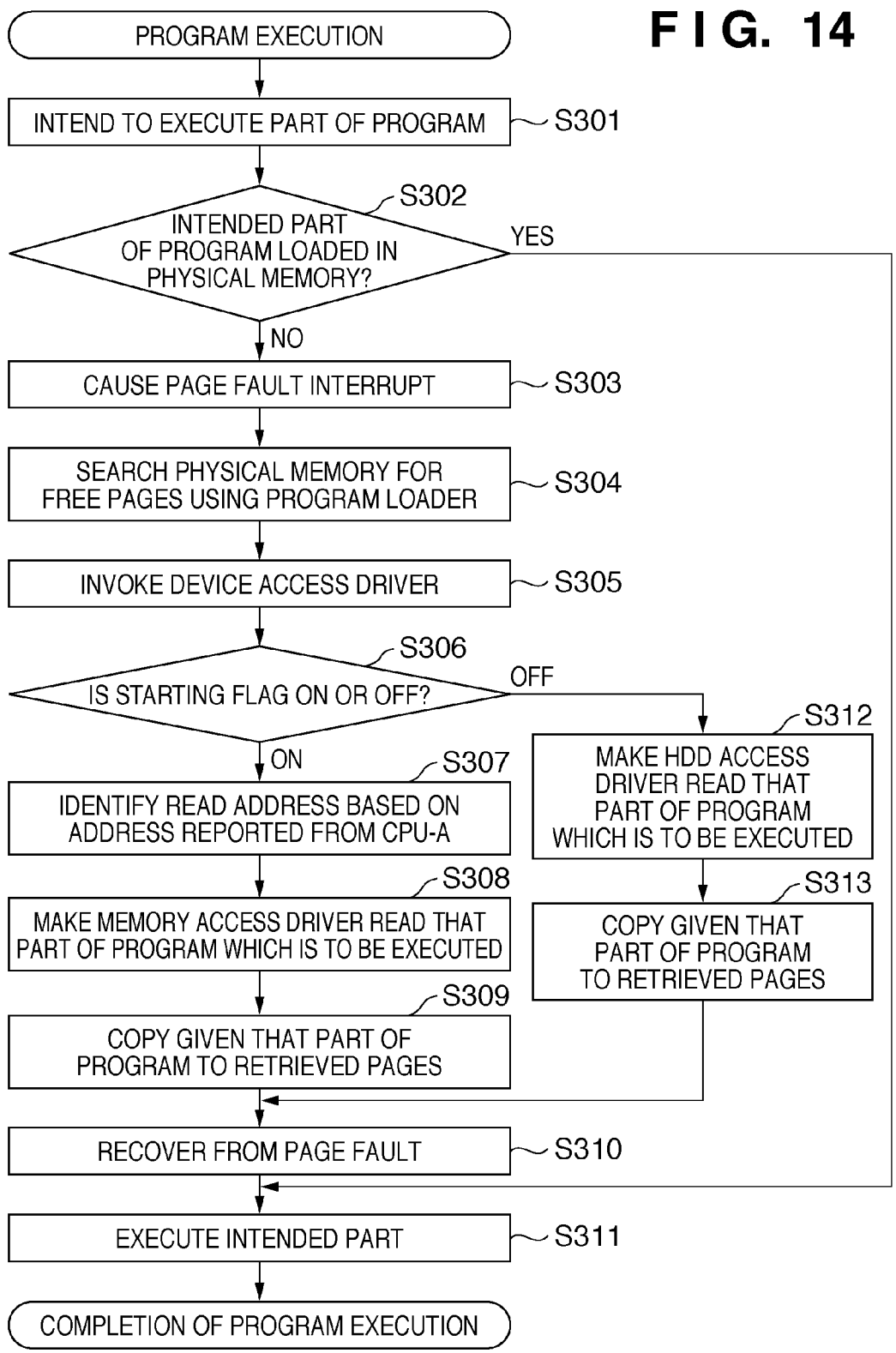

INFORMATION PROCESSING APPARATUS AND CONTROL METHOD THEREOF

BACKGROUND OF THE INVENTION

1. Field of the Invention

The present invention relates to an information processing apparatus equipped with multiple CPUs, and a control method thereof.

2. Description of the Related Art

Conventional devices with embedded software use a simple static memory allocation system. This system involves copying an entire program from a secondary storage device such as a hard disk or ROM to a main storage device such as a main memory (DRAM) before running the program on the main storage device. Recently, however, an operating system such as Windows™ or Linux™ with a virtual memory system has come to be used on embedded devices.

Virtual memory systems are generally implemented using paging technology, and operating systems such as Windows™ and Linux™ also use a paging system for their memory allocation system. The paging system, which will be described in detail later, has the following advantages compared to a static memory allocation system:
1. allows effective use of available memory, and
2. allows the use of more memory space than amounts of installed memory.

However, the paging system has the disadvantage of slow execution.

This is because the paging system loads only "parts of the program" that is frequently implemented in the main storage device while keeping "the entire program" stored in the secondary storage device such as a hard disk. With such a system, each time a CPU is going to execute the "other part of the program" not loaded in the main storage device, the CPU has to load "that other part of the program" which is to be implemented from the secondary storage device into the main storage device. Consequently, random-access reads from the secondary storage device are required when the program is executed.

The static memory allocation system and paging system will be described now.

The static memory allocation system loads all parts of a program together from the hard disk into physical memory. In many cases, architectures which use the static memory allocation system make no distinction between a virtual memory space and a physical memory space. When executing, for example, "part C of a program," since the entire program is placed in the physical memory space, the CPU can implement the program promptly.

On the other hand, the paging system manages a virtual memory system by dividing a virtual memory space and a physical memory space into predetermined units of pages. This system is adopted by general purpose operating systems such as Windows™ and Linux™. Linux™, for example, uses a page size of 4 KB. In this way, the paging system puts only part (in units of pages) of a program instead of the entire executable program or data file in the physical memory and maps the physical memory to the virtual memory. If physical memory pages are not mapped to virtual memory pages accessed by the CPU, pages are read from the secondary storage device to the physical memory. This process is known as page-in. When a program not stored in the physical memory is executed, a page fault interrupt occurs. The page fault interrupt triggers a routine which searches the physical memory for free pages which are currently available in the physical memory. If free pages are found, the program is loaded from the secondary storage device onto the free pages. Then, after translating addresses between a part of the program in the virtual memory and part of the program in the physical memory, the system exits the page fault interrupt process and returns to normal processing to allow the CPU to execute the program in the virtual memory.

Among secondary storage devices, hard disks in particular are known for long random-access time. Thus, when programs are stored on a hard disk, the paging system has lower execution speed than the static memory allocation system.

Japanese Patent Laid-Open No. 2007-35066 describes a system which enables high-speed startup by creating a file system such as a RAM disk in a main storage device and copying a program from a secondary storage device to the RAM disk in advance during system initialization.

However, since it is not possible to delete or move a running program due to the characteristics of a virtual memory system, the RAM disk or a program copied to the RAM disk cannot be deleted during system operation. This is disadvantageous in that part of the main storage device is constantly used as the RAM disk, reducing the free space of the main storage device available to the system. Such a program can exceed 100 MB in size, in the case of, for example, a multifunction peripheral, and it is not desirable to make such a program reside in the main storage device from the viewpoint of space efficiency of the main storage device.

SUMMARY OF THE INVENTION

An aspect of the present invention is to eliminate the above-mentioned problems with the conventional technology.

It is a feature of the present invention to provide a technique for reducing the time required for startup as well as for exiting a power-saving mode quickly while taking advantage of a paging system.

According to an aspect of the present invention, there is provided an information processing apparatus having a first storage unit and a second storage unit, comprising:

a first processing unit configured to execute a first OS stored in the first storage unit;

a second processing unit configured to execute a second OS stored in the second storage unit; and a third storage unit configured to store a program to be executed on the second OS, wherein the first processing unit loads the program to be executed on the second OS from the third storage unit into the first storage unit, and the second processing unit causes the second OS to execute the program loaded in the first storage unit.

According to another aspect of the present invention, there is provided a control method for an information processing apparatus having at least a first processing unit and a second processing unit and a first storage unit and a second storage unit, comprising the steps of:

causing the first processing unit to execute a first OS stored in the first storage unit;

causing the second processing unit to execute a second OS stored in the second storage unit;

causing the first processing unit to load a program to be executed on the second OS from a third storage unit into the first storage unit; and causing the second OS, via the second processing unit, to execute the program to be executed on the second OS, with the program loaded in the first storage unit.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 14 is a flowchart illustrating processes performed when a program is executed by CPU-B of the image input/output apparatus according to the present embodiment.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Before describing the exemplary embodiment of the present invention in detail, features of the present embodiment will be described briefly.

With an image input/output apparatus (e.g., information processing apparatus or multifunction peripheral) according to the present embodiment, programs are copied from a secondary storage device (such as an HDD) to a main storage device (main memory) in advance. Also, a flag is provided to indicate whether the system is "starting up or exiting from power-saving mode" or in "normal operation".

When page swapping is required, a paging system performs the page swapping with reference to the flag: swaps out pages using the programs copied to the main storage device during "startup or exit from power-saving mode", or swaps in pages from the secondary storage device in "normal operation". Consequently, during "startup or exit from power-saving mode", it is possible to start up quickly from the main storage device for which random access does not become a bottleneck in page swapping. Also, in "normal operation", since pages are swapped in from the secondary storage device, unnecessary programs can be deleted from the main storage device. This eliminates the disadvantage of reduction in the free space of the main storage device available to the system.

Furthermore, in a system with two or more CPUs, after a fast OS (first OS: light OS) on a first CPU is started, the system waits for an OS (heavy OS) to complete startup, where the heavy OS runs on a second CPU and uses a paging system. During the wait, a program for the heavy OS (second OS) is copied from the secondary storage device to a specific address in the main storage device. This further reduces the startup time of the heavy OS.

Figure 1:
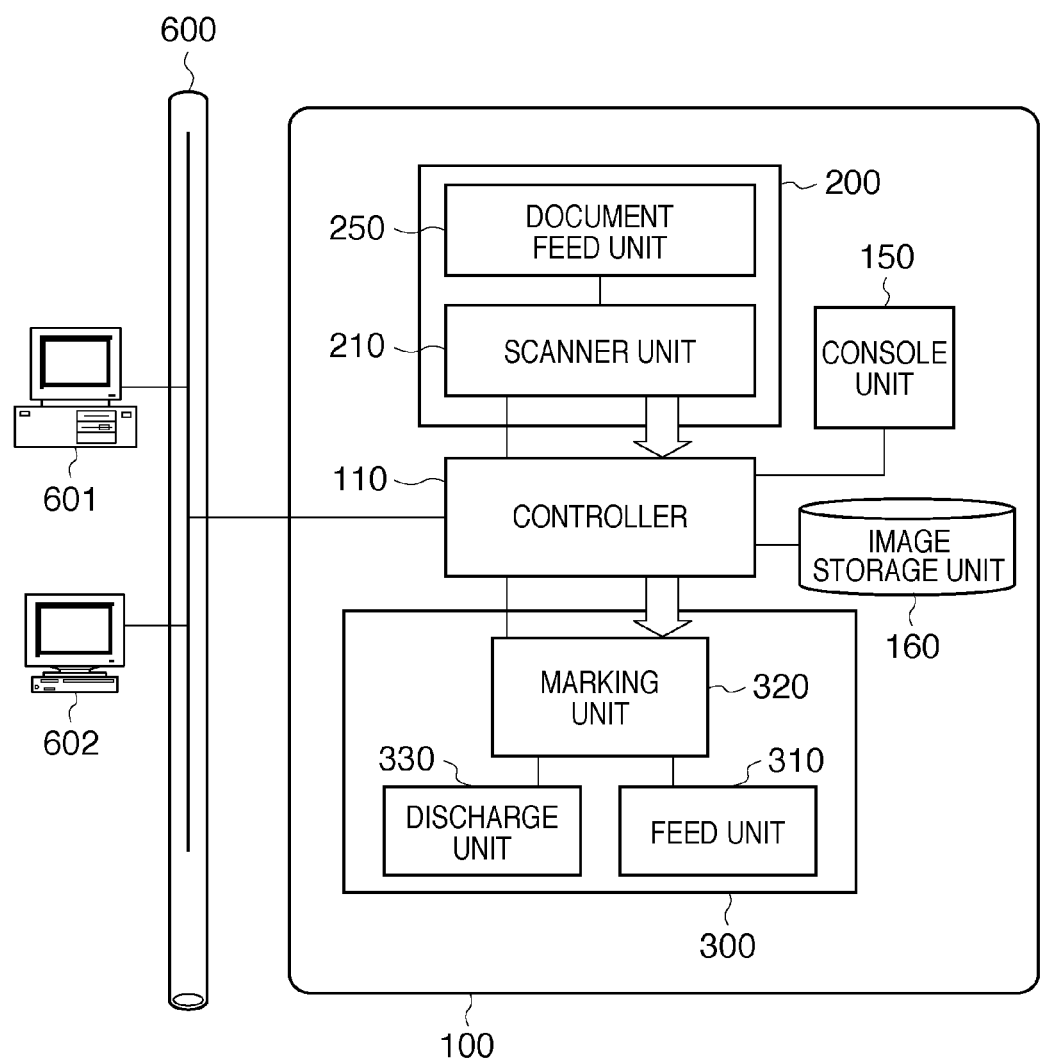
FIG. 1 is a block diagram showing a functional configuration of an image input/output apparatus (information processing apparatus) according to an exemplary embodiment of the present invention.

FIG. 1 is a block diagram showing a functional configuration of an image input/output apparatus (information processing apparatus) 100 according to the present embodiment, where the image input/output apparatus 100 is equipped with a controller. Incidentally, although a multifunction peripheral with copy, facsimile, printer, and other functions is taken as an example of the image input/output apparatus in the present embodiment, the present invention is not limited to this.

The image input/output apparatus 100 is connected to host computers (a first host computer 601 and second host computer 602, according to the present embodiment) via a LAN 600 such as an Ethernet network. The image input/output apparatus 100 includes a reading apparatus (reader unit) 200 which reads an original to generate image data, a printing apparatus (printer unit) 300 which prints the image data, a console unit 150, an image storage unit 160, and a controller 110 which controls the above components. The console unit 150 includes a keyboard used to input and output image data and a liquid display panel used to display image data and various functions and make settings for them. The image storage unit 160 stores the image data inputted via the reader unit 200 as well as image data generated from code data received from the first host computer 601 or second host computer 602 via the LAN 600. The controller 110 is connected to these components and controls them.

The reader unit 200 includes a document feed unit 250 which transports documents and a scanner unit 210 which optically reads the documents and converts them into image data in the form of an electrical signal. On the other hand, the printer unit 300 includes a feed unit 310 equipped with multiple tiers of paper cassettes which contain sheets, a marking unit 320 which transfers and fixes image data to the sheets, and a discharge unit 330 which discharges the printed sheets after sorting and stapling processes.

The controller 110 has a copy function, a scanner function, a printer function, and other functional blocks, where the copy function reads documents by controlling the reader unit 200 and prints image data of the documents on sheets by controlling the printer unit 300, the scanner function further converts image data read via the reader unit 200 into code data and transmits the code data to the host computer 601 (602) via the network 600, and the printer function converts code data received from the host computer 601 (602) via the network 600 into image data, outputs the image data to the printer unit 300, and prints the image data using the printer unit 300.

Figure 2:
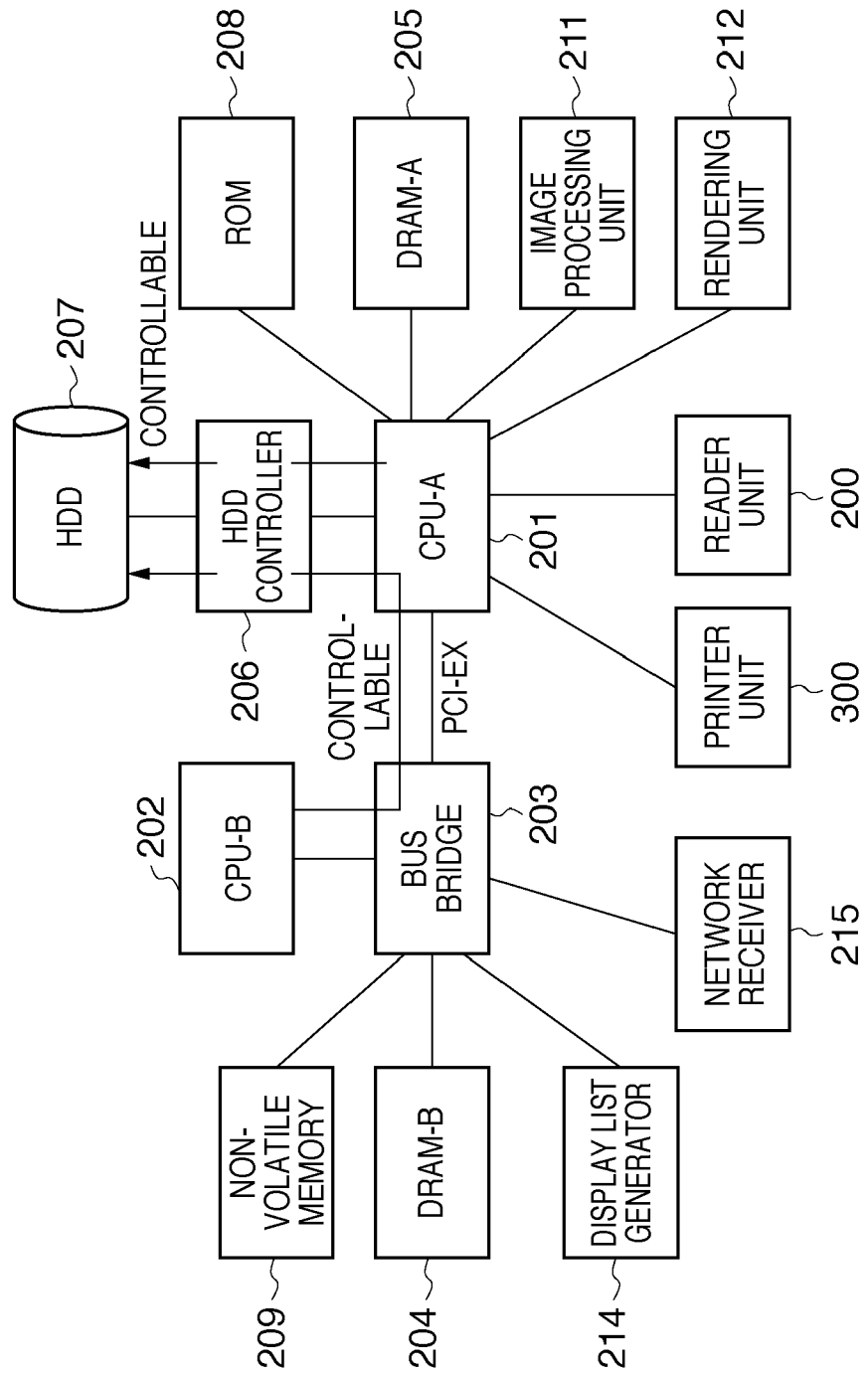
FIG. 2 is a block diagram explaining a configuration of a controller of the image input/output apparatus according to the embodiment of the present invention as well as access to an HDD.

FIG. 2 is a block diagram illustrating a configuration of the controller 110 of the image input/output apparatus according to the present embodiment as well as access to an HDD, wherein the same components as those in FIG. 1 are denoted by the same reference numerals as the corresponding components in FIG. 1, and description thereof will be omitted.

The controller 110 includes two CPUs: CPU-A (a first CPU) 201 and CPU-B (a second CPU) 202. A bus bridge 203 mediates buses of the two CPUs 201 and 202. Reference numeral 204 denotes DRAM-B (a second storage unit), numeral 205 denotes DRAM-A (a first storage unit), 206 denotes a hard disk controller, numeral 207 denotes a hard disk (a third storage unit), numeral 208 denotes a ROM, and numeral 209 denotes a non-volatile memory. Also, reference numeral 211 denotes an image processing unit, numeral 212 denotes a rendering unit, numeral 214 denotes a display list generator, and numeral 215 denotes a network receiver.

In FIG. 2, CPU-A 201 is connected with DRAM-A 205 via a local bus. Also, DRAM-B 204 is connected to a local bus of CPU-B 202. CPU-A 201 is connected with the hard disk (HDD) 207 via the hard disk controller 206, and can read and write data to/from the hard disk 207. The ROM 208 is connected to a ROM bus of CPU-A 201 and is accessible from CPU-A 201. Also, CPU-A 201 is connected with CPU-B 202 via the bus bridge 203 and a PCI-EX bus. Consequently, CPU-B 202 can access the HDD 207 via the bus bridge 203, PCI-EX bus, and hard disk controller 206. Thus, CPU-B 202 can read and write data to/from the HDD 207. In this way, FIG. 2 shows that CPU-A 201 and CPU-B 202 can access the HDD 207.

The image processing unit 211, rendering unit 212, reader unit 200, printer unit 300, display list generator 214, and network receiver 215 will be described later.

Figure 3:
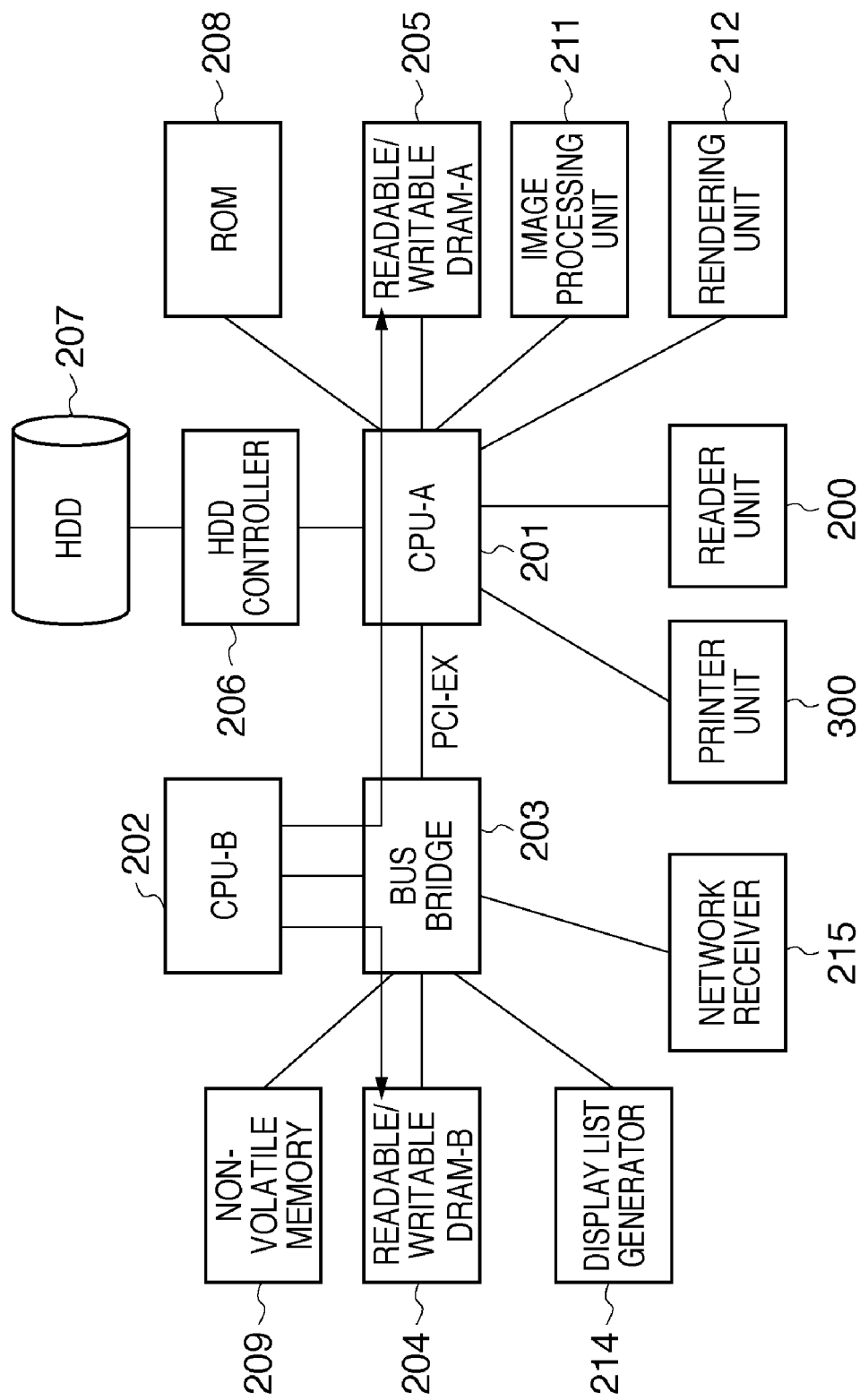
FIG. 3 is a block diagram explaining an access to a DRAM by the controller of the image input/output apparatus according to the present embodiment.

FIG. 3 is a block diagram illustrating DRAM access by the controller 110 of the image input/output apparatus according to the present embodiment, wherein the same components as those in FIG. 2 are denoted by the same reference numerals as the corresponding components in FIG. 2, and description thereof will be omitted. FIG. 3 shows that CPU-B 202 can also access DRAM-A 205 via the bus bridge 203, PCI-EX bus, and the like.

In FIG. 3, CPU-A 201 is connected with DRAM-A 205 via a local bus while CPU-B 202 is connected with DRAM-B 204 via a local bus. Thus, CPU-A 201 can read and write to/from DRAM-A 205 while CPU-B 202 can read and write to/from DRAM-B 204. Also, CPU-B 202 can access DRAM-A 205 via the bus bridge 203, PCI-EX bus, and the like.

Figure 4:
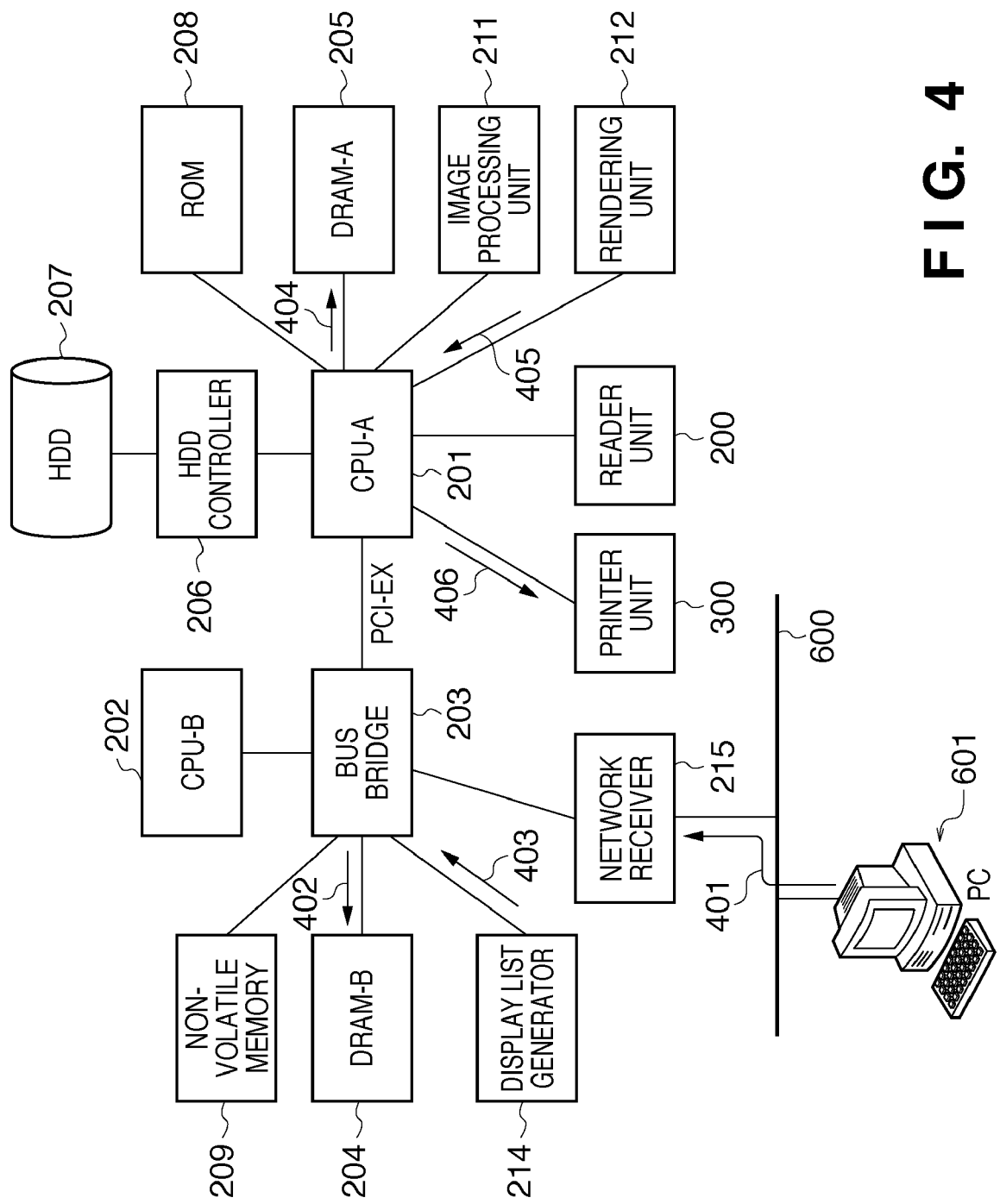
FIG. 4 is a diagram illustrating a data flow when print data from a PC is received and printed by the image input/output apparatus according to the present embodiment.

FIG. 4 is a diagram illustrating a data flow when print data from a PC is received and printed by the image input/output apparatus according to the present embodiment, wherein the same components as those in FIGS. 1 to 3 are denoted by the same reference numerals as the corresponding components in FIGS. 1 to 3, and description thereof will be omitted.

Reference numeral 401 denotes a state that print data (PDL data) transmitted from the PC 601 via the LAN 600 is received by a network receiver 215. The print data transmitted from the PC 601 is normally described in a printer control language such as PS (PostScript). Next, numeral 402 denotes a state that the print data is stored in DRAM-B 204 under the control of CPU-B 202.

Reference numeral 403 denotes a state that the print data described in the printer control language and stored in DRAM-B 204 is subjected to software-based processing by CPU-B 202 or processing by the display list generator 214 to generate a display list using the printer control language. The display list is a set of drawing commands created by describing and listing a group of commands related to drawing for efficient processing during drawing.

Next, reference numeral 404 denotes a state that CPU-A 201 transfers and stores the display list in DRAM-A 205. Reference numeral 405 denotes a state that the rendering unit 212 renders the print data of the display list stored in DRAM-A 205 into raster image data. The resulting raster image data is stored again in DRAM-A 205 in 404.

Finally, reference numeral 406 denotes a state that the raster image data is supplied from DRAM-A 205 and printed by the printer unit 300.

Figure 5:
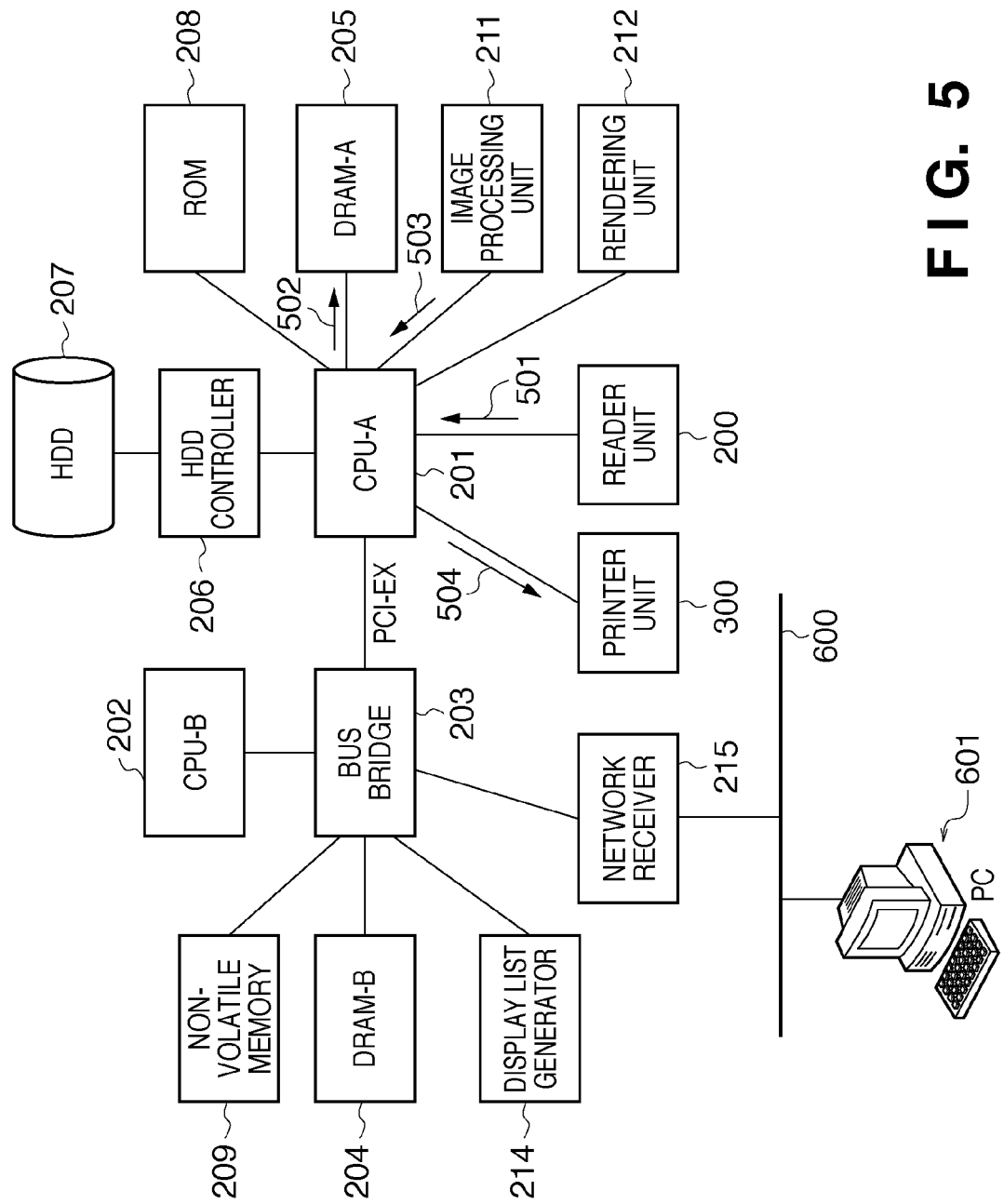
FIG. 5 is a diagram illustrating a data flow when data read by a reader unit of the image input/output apparatus according to the present embodiment is printed.

FIG. 5 is a diagram illustrating a data flow when data read by the reader unit 200 of the image input/output apparatus according to the present embodiment is printed, wherein the same components as those in FIGS. 1 to 4 are denoted by the same reference numerals as the corresponding components in FIGS. 1 to 4, and description thereof will be omitted.

Reference numeral 501 denotes a state that the document data read via the reader unit 200 is inputted in CPU-A 201. Reference numeral 502 denotes a state that the document data is stores in DRAM-A 205. Reference numeral 503 denotes a state that the image data in DRAM-A 205 is subjected to image processing including rotation, scaling, and binarization. After the image processing, the image data is stored again in DRAM-A 205 in 502. Reference numeral 504 denotes a state that CPU-A 201 outputs and prints the image data (subjected to the image processing) on the printer unit 300.

Rendering and image processing such as described above consume large amounts of memory. Thus, the larger the capacity of DRAM-A 205 and DRAM-B 204, the better, but the memory capacity has to be traded off against cost. As described above, if a file system such as a RAM disk is created in DRAM-A 205 and a program is copied from the HDD 207 to the RAM disk in advance, the program can be started up quickly. However, this is disadvantageous because part of DRAM-A 205 is constantly used as the RAM disk, reducing free space available to the system.

Thus, according to the present embodiment, to achieve quick startup, DRAM-A 205 is used to store the programs from the HDD 207 during startup. On the other hand, in normal operation, DRAM-A 205 is used as a memory area for image processing and rendering.

Figure 6:
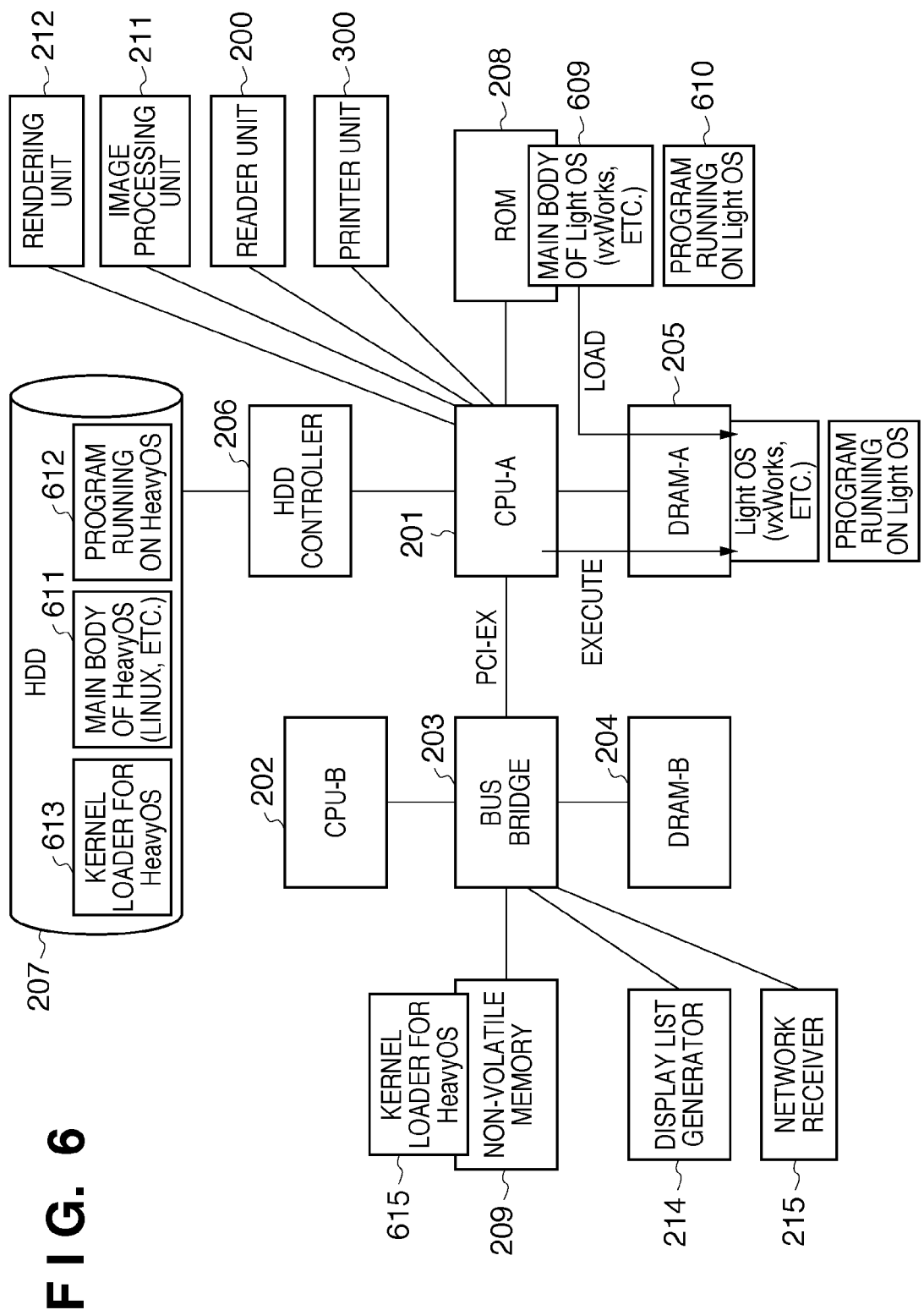
FIG. 6 is a diagram illustrating program changeovers on the image input/output apparatus according to the present embodiment.

FIG. 6 is a diagram illustrating program changeovers on the image input/output apparatus according to the present embodiment, wherein the same components as those in FIGS. 1 to 5 are denoted by the same reference numerals as the corresponding components in FIGS. 1 to 5, and description thereof will be omitted.

The ROM 208 contains a light OS (first OS) 609 and a program 610 running on the light OS.

On the other hand, the hard disk (HDD) 207 contains a heavy OS (second OS) 611, a program 612 running on the heavy OS, and a kernel loader 613 for the heavy OS. Also, a kernel loader 615 for the heavy OS is stored in the non-volatile memory 209.

Again, CPU-A 201 is connected with DRAM-A 205 via a local bus while CPU-B 202 is connected with DRAM-B 204 via a local bus. The hard disk (HDD) 207 is connected to CPU-A 201 via the hard disk controller 206. Thus, CPU-A 201 can access the hard disk 207. CPU-A 201 is connected with CPU-B 202 via the bus bridge 203 and PCI-EX bus. Also, the ROM 208 is connected to the ROM bus of CPU-A 201 and is accessible from CPU-A 201.

The ROM 208 contains the light OS (first OS) 609 and the program 610 running on the light OS 609. According to the present embodiment, the light OS 609 is an embedded OS such as VxWorks™. The program 610 (first program), which runs on the light OS 609, performs control such as causing the image processing unit 211 to process the document data read via the reader unit 200. Alternatively, the program 610 is software which, being specialized mainly in image processing, performs control such as causing the rendering unit 212 to render the display list.

The heavy OS 611 and the program 612 running on the heavy OS 611 are stored on the hard disk 207. According to the present embodiment, the heavy OS 611 is a general purpose OS such as Linux™. In the case of Linux™, the heavy OS 611 serves as a Linux™ kernel and the program 612 (second program) is a program running on Linux™. The program 612 is software which performs processes such as causing the display list generator 214 to print the data described in a printer control language and received by the network receiver 215. Alternatively, the program 612 may process the display list by itself. In this way, the program 612 mainly performs control for a copier such as controlling print data or copy data entered by a user.

CPU-A 201 operates by executing the light OS 609 and the program 610 loaded into DRAM-A 205 from the ROM 208.

The non-volatile memory 209 is connected to CPU-B 202 via the bus bridge 203. Normally, CPU-B 202 starts up the heavy OS 611 by loading the heavy OS 611 into DRAM-B 204 using the heavy OS's kernel loader 615 in the non-volatile memory 209. Incidentally, the kernel loader 615 for the heavy OS may be stored on the hard disk 207. In that case, CPU-B 202 will start up the heavy OS 611 by loading the heavy OS 611 into DRAM-B 204 using the heavy OS's kernel loader 613 on the hard disk 207. Normally, only one of the kernel loaders 613 and 615 for the heavy OS is sufficient.

Figure 7:
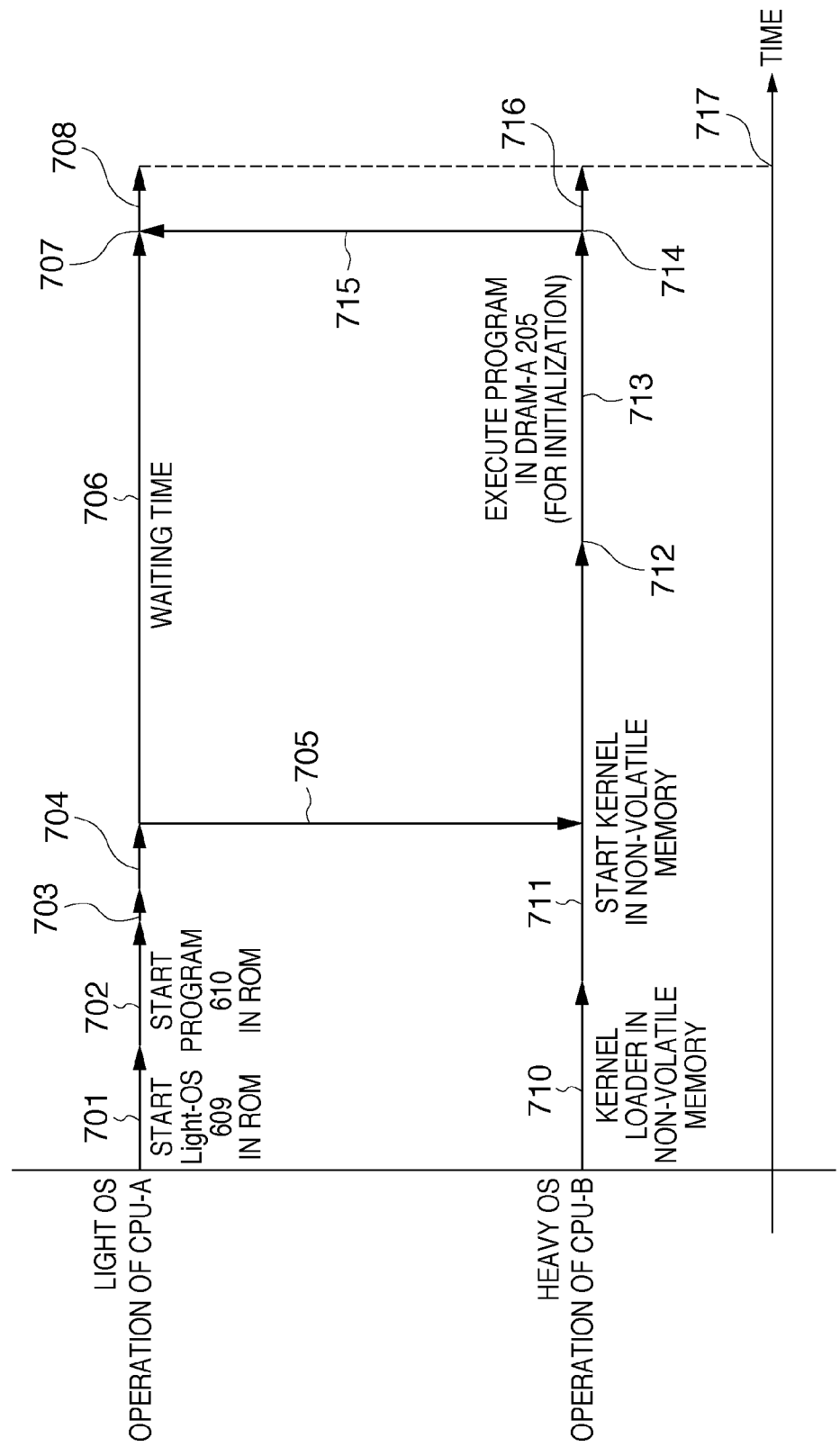
FIG. 7 is a time chart showing operation of the image input/output apparatus according to the present embodiment on startup.

FIG. 7 is a time chart showing operation of the image input/output apparatus according to the present embodiment on startup, wherein the abscissa represents time, along which operations of CPU-A 201 and CPU-B 202 are described.

When the apparatus is started, in 701, CPU-A 201 starts the light OS 609 (e.g., VxWorks™) in the ROM 208. In 702, CPU-A 201 starts the program 610 which runs on the light OS in the ROM 208. In 703, CPU-A 201 reserves a memory area in DRAM-A 205 in order for CPU-B 202 to store the program 612 which runs on the heavy OS 611. In 704, CPU-A 201 loads the program 612 into the memory area of DRAM-A 205 reserved in 703 from the hard disk 207. In 705, CPU-A 201 notifies CPU-B 202 of memory addresses into which the program 612 has been loaded. Numeral 706 denotes waiting time period (standby time) until CPU-B 202 starts up.

On the other hand, in 710, CPU-B 202 loads the kernel of the heavy OS 611 into DRAM-B 204 using the kernel loader 615 in the non-volatile memory 209. In 711, CPU-B 202 starts the kernel. The kernel runs using the static memory allocation system. In 712, a software flag (Starting flag) managed by CPU-B 202 is turned on. In a time period 713, CPU-B 202 executes the program 612 which runs on the heavy OS 611 in DRAM-A 205 (for initialization). Although random access to DRAM-A 205 occurs because the program runs using the paging system, execution speed of the program does not fall because the DRAM allows high-speed random-access reads. Once the program is executed (for initialization), the Starting flag turned on in 712 is turned off at a timing 714. In 715, CPU-B 202 notifies CPU-A 201 about completion of startup.

Upon receiving the notification of completion of startup, in 707, CPU-A 201 releases the memory area reserved in 703. In time periods 708 and 716, CPU-A 201 and CPU-B 202 conduct negotiations. Consequently, startup is completed in a timing 717.

The completion of startup in the timing 717 indicates that both CPU-A 201 and CPU-B 202 have started successfully and that negotiations have been completed.

The above processes are summarized as follows.

(1) A program used by CPU-B 202 is copied in advance to the high-speed DRAM-A 205 which, being connected to a local bus of CPU-A 201, allows high-speed random access. This reduces the time period required before CPU-B 202 can execute the program. That is, since there is no need for CPU-B 202 to access the hard disk which provides slow random-access reads, it is possible to reduce processing time period.

(2) The program used by CPU-B 202 is copied by CPU-A 201 to the high speed DRAM-A 205 connected to the local bus of CPU-A 201 during the waiting time period 706 in which CPU-A 201 waits for CPU-B 202 to start up. This further reduces the startup time.

Figure 8:
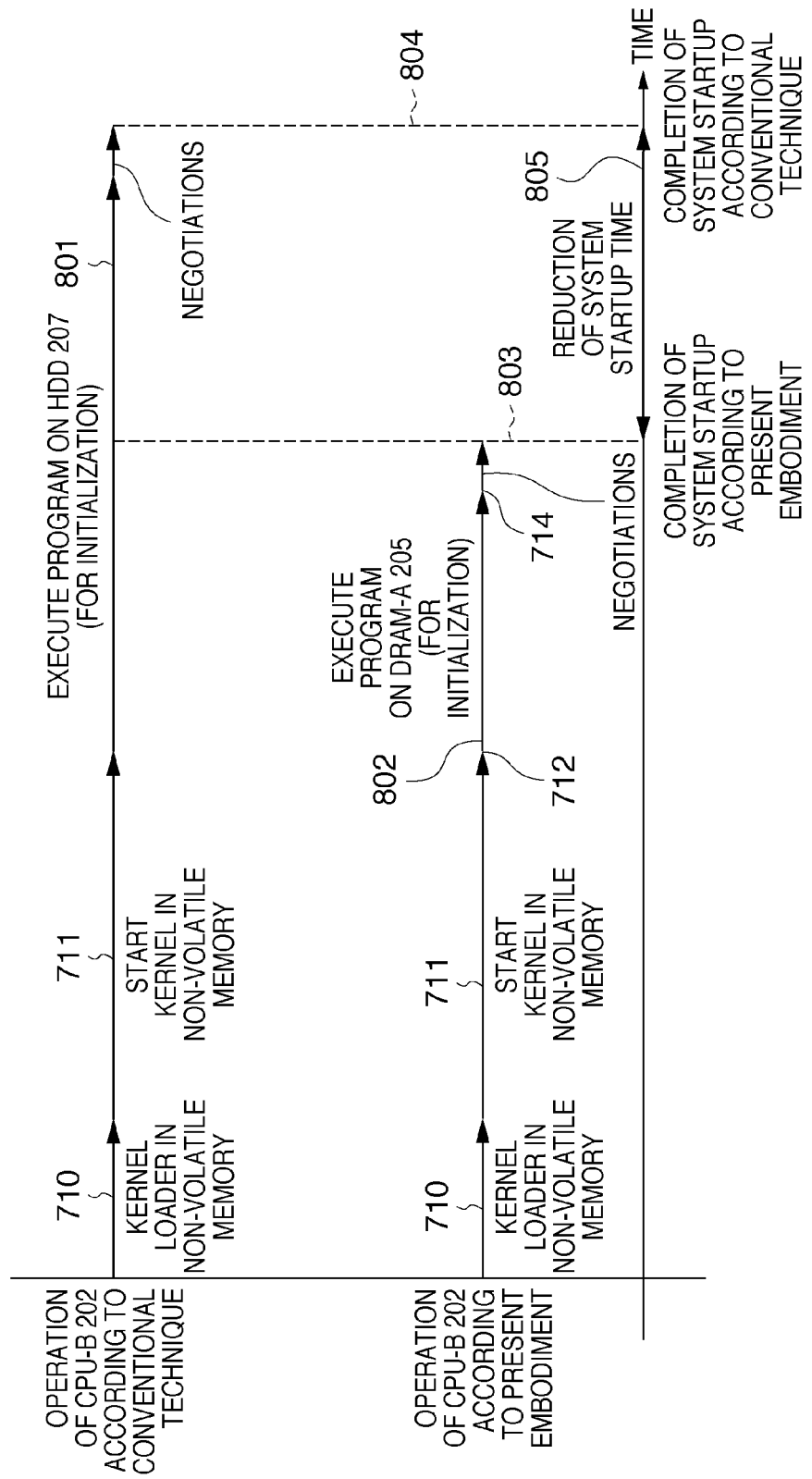
FIG. 8 is a time chart showing a comparative example, comparing system startup time between the image input/output apparatus according to the present embodiment and a conventional technique.

FIG. 8 is a time chart showing a comparative example, comparing system startup time between the image input/output apparatus according to the present embodiment and a conventional technique. FIG. 8 shows operation of only CPU-B 202. The abscissa represents time, along which operation of CPU-B according to the conventional technique is described at the top and operation of CPU-B 202 according to the present embodiment is described at the bottom. In FIG. 8, the same components as those in FIG. 7 are denoted by the same reference numerals as the corresponding components in FIG. 7, and description thereof will be omitted.

Numeral 801 denotes a time period during which a program on the hard disk 207 is executed. Numeral 802 denotes a time period during which a program in DRAM-A 205 is executed. The apparatus according to the present embodiment completes its startup at a timing 803 and the entire system according to the conventional technique completes its startup at the timing 804. Thus, it can be seen that the time period required to execute the program in DRAM-A 205 is shorter than the time period 801 required to execute the program on the hard disk 207 by the difference between the timing 804 and timing 803, meaning that the system startup time is reduced by the amount represented by a time period 805.

Figure 9:
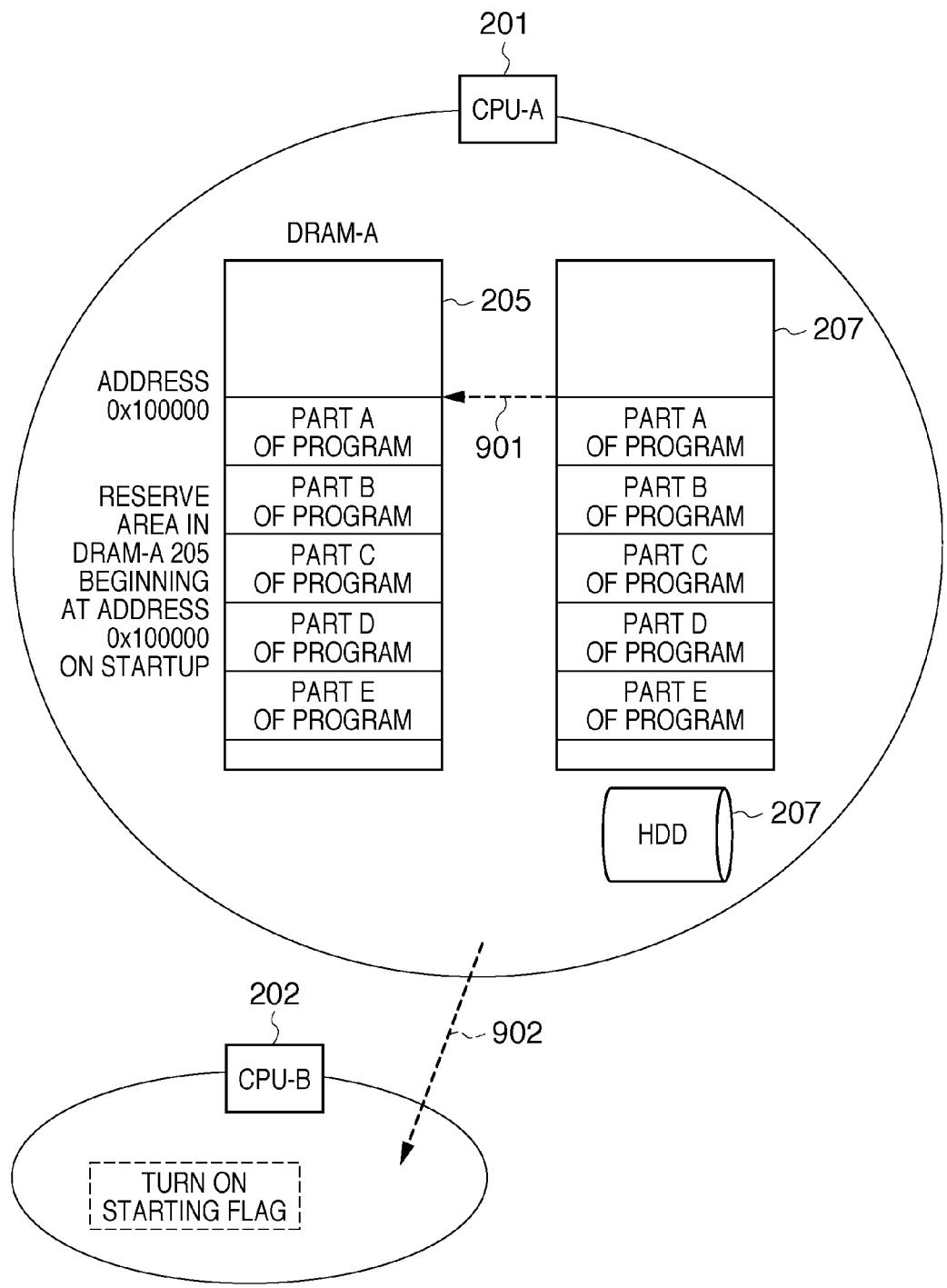
FIG. 9 is an explanatory diagram illustrating the first half of a startup process of the image input/output apparatus according to the present embodiment.

FIG. 9 is an explanatory diagram illustrating the first half of a startup process of the image input/output apparatus according to the present embodiment.

(1) When the apparatus is started, CPU-A 201 starts the light OS 609 in the ROM 208. In DRAM-A 205 connected via the local bus, CPU-A 201 reserves an area (e.g., beginning at address 0x100000) to store the program used by CPU-B 202. At the same time, CPU-B 202 starts the heavy OS 611 using the kernel loader 615 in the non-volatile memory 209.

(2) In 901, parts A to E of the program are copied from the hard disk 207 to the area reserved in DRAM-A 205. Consequently, parts A to E of the program are stored in DRAM-A 205.

(3) In 902, CPU-A 201 notifies CPU-B 202 about the starting address (0x100000) of the area copied to DRAM-A 205.

(4) Upon receiving the notification, CPU-B 202 notifies a device access driver running on CPU-B 202 of the address (0x100000). Then, CPU-B 202 turns on the software flag (Starting flag).

Now, CPU-B 202 can execute the program in DRAM-A 205.

Figure 10:
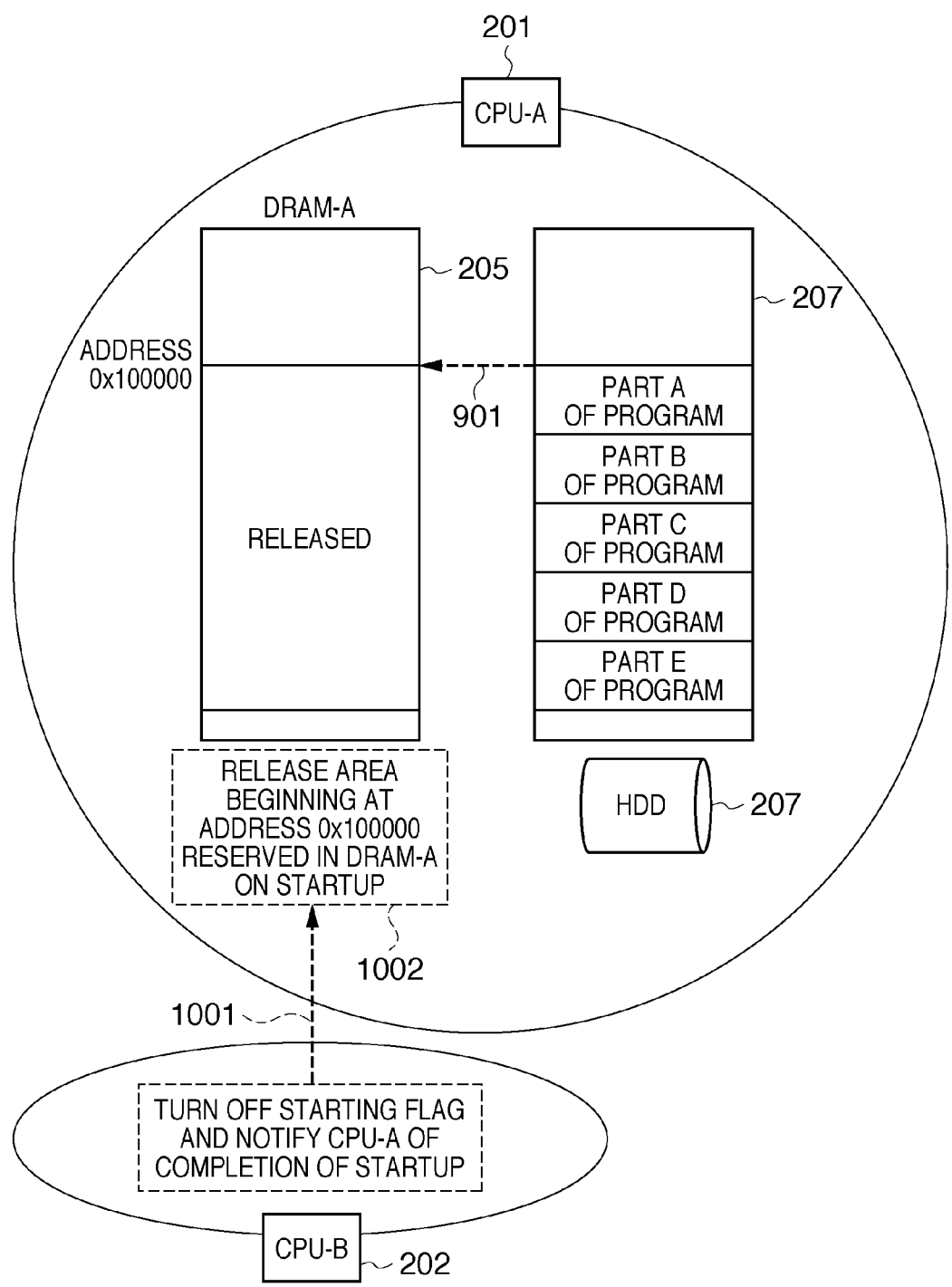
FIG. 10 is an explanatory diagram illustrating the second half of the startup process of the image input/output apparatus according to the present embodiment.

FIG. 10 is an explanatory diagram illustrating the second half of the startup process of the image input/output apparatus according to the present embodiment.

FIG. 10 describes operation performed by CPU-A 201 after CPU-B 202 executes the program in DRAM-A 205 and thereby completes initialization.

(1) Once the program in DRAM-A 205 is executed (for initialization), CPU-B 202 turns off the Starting flag and notifies CPU-A 201 of the completion of startup (1001).

(2) Upon receiving the notification, CPU-A 201 releases the area (e.g., beginning at address 0x100000) reserved in DRAM-A 205 (1002). Consequently, the memory area reserved in DRAM-A 205 on startup is released and becomes available for use to store other programs or data.

Figure 11:
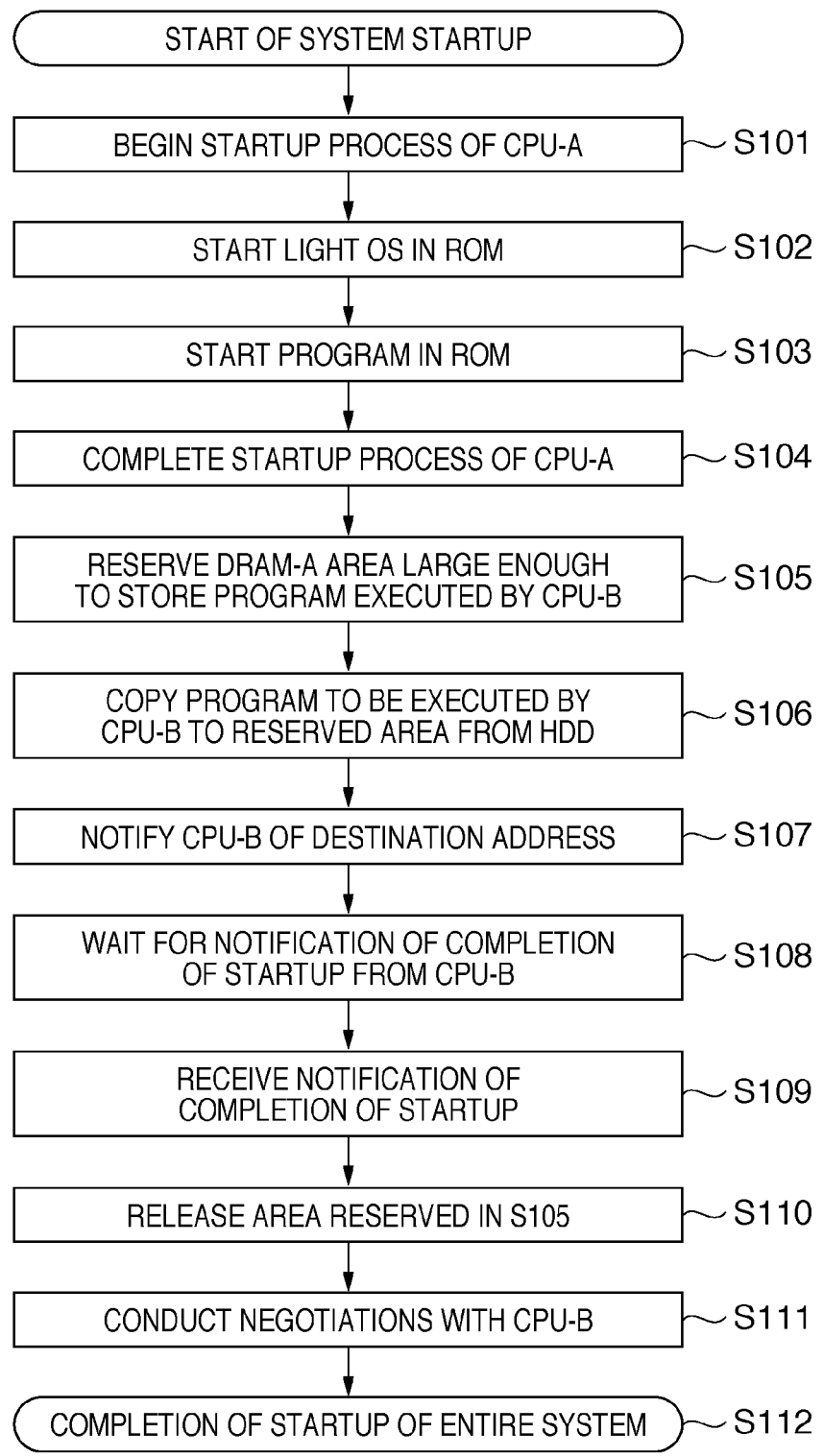
FIG. 11 is a flowchart showing operation of CPU-A on startup of the image input/output apparatus according to the present embodiment.

FIG. 11 is a flowchart showing operation of CPU-A 201 on startup of the image input/output apparatus according to the present embodiment.

The procedures are started when the apparatus begins to start. In step S101, CPU-A 201 begins a startup process. After that, the process advances to step S102 to activate the light OS 609 (e.g., VxWorks™) in the ROM 208. In step S103, CPU-A 201 starts the program 610 which runs on the light OS in the ROM 208. When the program is executed for initialization, the startup process of CPU-A 201 is completed (step S104).

The process then advances to step S105, where CPU-A 201 reserves a memory area in DRAM-A 205 in order for CPU-B 202 to store the program which runs on the heavy OS 611. The process advances to step S106, where CPU-A 201 loads the program into the reserved memory area of DRAM-A 205 from the hard disk 207. The process advances to step S107, where CPU-A 201 notifies CPU-B 202 of memory addresses into which the program has been loaded in step S106. In step S108, CPU-A 201 waits for a notification of completion of startup from CPU-B 202. When a notification of completion of startup is received from CPU-B 202 in step S109, the process advances to step S110, where CPU-A 210 releases the area in DRAM-A 205 reserved in step S105. The process advances to step S111, CPU-A 201 conducts negotiations with CPU-B 202. In step S112, startup of the entire system is completed.

Figure 12:
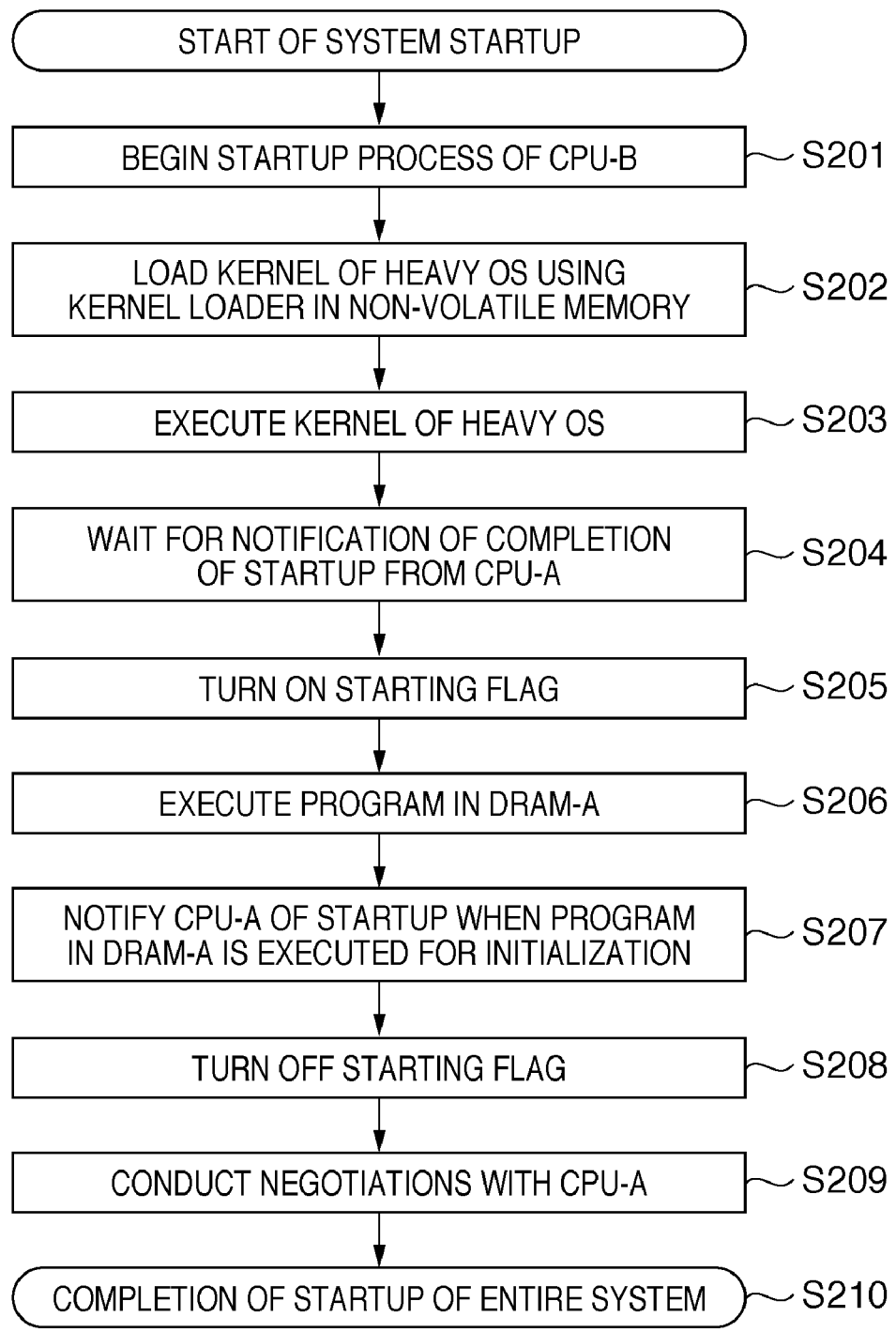
FIG. 12 is a flowchart showing operation of CPU-B on startup of the image input/output apparatus according to the present embodiment.

FIG. 12 is a flowchart showing operation of CPU-B on startup of the image input/output apparatus according to the present embodiment.

The procedures are started when the apparatus begins to start. In step S201, CPU-B 202 begins a startup process. After then, the process advances to step S202, where CPU-B 202 loads the kernel loader 613 from the hard disk 207 into DRAM-B 204 using the kernel loader 615 in the non-volatile memory 209. In step S203, CPU-B 202 starts the kernel loader 613. The kernel loader 613 runs using the static memory allocation system. Next, the process advances to step S204, where CPU-B 202 waits for notification (issued by CPU-A 201 in step S107 in FIG. 11) of the addresses into which CPU-A 201 has loaded the program for CPU-B. Upon notification of the addresses, the process advances to step S205, where CPU-B 202 turns on the software flag (Starting flag) managed by CPU-B 202. Next, in step S206, CPU-B 202 executes the program 612 which runs on the heavy OS in DRAM-A 205 (for initialization). Once the program is executed (for initialization), startup of CPU-B 202 is complete and CPU-B 202 notifies CPU-A 201 of the completion of the startup of CPU-B 202, in step S207. In Step S208, CPU-B 202 turns off the Starting flag. The process advances to step S209, where CPU-B 202 conducts negotiations with CPU-A 201. In step S210, the startup of the entire system is completed.

Figure 13:
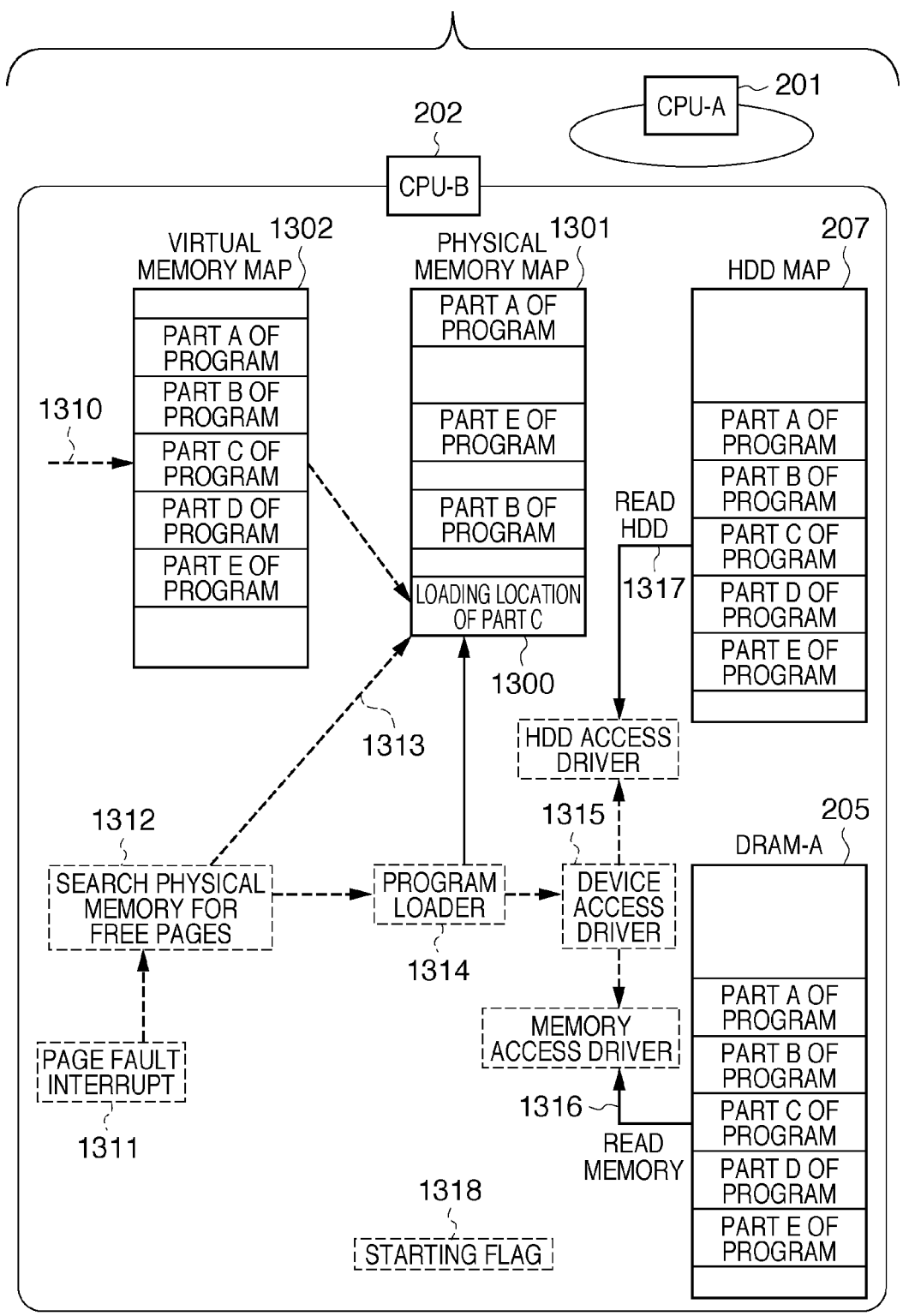
FIG. 13 is an explanatory diagram showing program execution by CPU-B of the image input/output apparatus according to the present embodiment.

FIG. 13 is an explanatory diagram showing program execution by CPU-B 202 of the image input/output apparatus according to the present embodiment.

In FIG. 13, reference numeral 1302 denotes a virtual memory, reference numeral 1301 denotes a physical memory, and HDD MAP means a memory map of a program stored in the hard disk 207. Reference numeral 1311 denotes a page fault interrupt and numeral 1312 denotes a routine which searches the physical memory 1301 for free pages. Reference numeral 1314 denotes a program loader and numeral 1315 denotes a device access driver. Reference numeral 1318 denotes a Starting flag. The physical memory 1301 corresponds, for example, to DRAM-B 204 (second memory area) described above.

1. Startup

During startup, the Starting flag 1318 remains on. Description will be given of a case in which during startup, CPU-B 202 executes the program 612 which runs on the heavy OS.

(1) CPU-B 202 tries to execute "part C of the program in the virtual memory 1302".

(2) Part C of the program has not been loaded on the physical memory 1301. Thus, page-in occurs.

(3) The page-in, which has occurred when CPU-B 202 tried to execute "part C of the program in the virtual memory 1302", causes a page fault interrupt 1311.

(4) The page fault interrupt 1311 triggers the routine 1312 which searches the physical memory 1301 for free pages to search the physical memory 1301 for free pages which are not in use (1313). Linux™ and the like use a page size of 4 KB.

(5) If a free area 1300 for use to load part C of the program is found in the physical memory 1301, the program loader 1314 accesses the device access driver 1315, reads part C of the program, and loads the part C into the physical memory 1301.

(6) The device access driver 1315 refers to the Starting flag 1318. During startup (i.e., if the Starting flag 1318 is on), the device access driver 1315 reads (1316) "part C of the program" from DRAM-A 205 (first memory area) via a memory access driver. Then, the program loader 1314 loads "part C of the program" onto "free pages (an area into which the part C of the program is loaded)" 1300. The memory access driver identifies memory addresses at which the part C of the program is stored using "information about storage addresses of the program in DRAM-A 205" provided in 902 in FIG. 9.

(7) After the part C of the program is loaded into the physical memory 1301 (after the loading is completed), addresses are translated between "part C of the program in the physical memory 1301" and "part C of the program in the virtual memory 1302." Subsequently, the system returns from interrupt handling to normal processing.

(8) Now, CPU-B 202 can execute "part C of the program in the virtual memory 1302".

In this way, since CPU-B 202 executes the program in DRAM-A 205 during startup, CPU-B 202 can start up quickly even in case of a random-access read due to page-in.

2. Normal Operation

When the startup process is completed, CPU-B 202 enters normal operation mode by "turning off the Starting flag," as shown in FIG. 10. In normal operation, CPU-B 202 executes the program 612 which runs on the heavy OS, as follows.

(1) to (5) are the same as those in the above described Startup sequence and s page-in process occurs as in the case of startup.

(6) The device access driver 1315 refers to the Starting flag 1318. Since the Starting flag 1318 is off during normal operation, the device access driver 1315 reads "part C of the program" from the hard disk 207 (1317) via a hard disk access driver. Then, the program loader 1314 loads "part C of the program" onto "free pages (a loading location of part C) 1300". In this case, operation of a hard disk access driver is the same as in the case of a normal paging system.

In this way, since the program in DRAM-A 205 is not accessed in normal operation, the memory area reserved in FIG. 9 may be released as shown in FIG. 10 while the Starting flag 1318 is off. This allows CPU-A 201 to use the memory area in DRAM-A 205 effectively in normal operation.

FIG. 14 is a flowchart illustrating processes performed when a program is executed by CPU-B 202 of the image input/output apparatus according to the present embodiment.

In step S301, CPU-B 202 intends to execute a part of the program. In step S302, CPU-B 202 determines whether or not the part of the program which is to be executed has been loaded in the physical memory 1301. If it is determined that the part of the program has been loaded, the process advances to step S31, where CPU-B 202 executes the part of the program, thereby completing the execution.

If it is determined in step S302 that the part of the program has not been loaded in the physical memory 1301, the process advances to step S303, where a page fault interrupt 1311 is occurred. As a result of the page fault interrupt 1311, the process advances to step S304, where the program loader 1314 executes the routine 1312 which searches the physical memory 1301 for free pages. Then, the process advances to step S305, where CPU-B 202 makes the device access driver 1315 page in that "part of the program which is to be executed by CPU-B 202". In step S306, CPU-B 202 makes the device access driver 1315 refer to the Starting flag 1318 and determines whether or not the Starting flag 1318 is on. If it is determined that the Starting flag 1318 is on, the process advances to step S307. In step S307, CPU-B 202 identifies a reading location based on the read address provided by CPU-A 201. In step S308, CPU-B 202 makes the memory access driver read "the part of the program which is to be executed by CPU-B 202" from the identified address of DRAM-A 205. In step S309, CPU-B 202 copies "the part of the program which is to be executed by CPU-B 202" and which has been read in step S308 to the free pages found in step S304. In step S310, CPU-B 202 returns from the page fault interrupt 1311.

On the other hand, if it is determined in step S306 that the Starting flag 1318 is off (indicating normal operation), the process advances to step S312. In step S312, CPU-B 202 makes the hard disk access driver read "the part of the program which is to be executed by CPU-B 202" out of the hard disk 207. In step S313, CPU-B 202 loads "the part of the program which is to be executed by CPU-B 202" and which has been read in step S313 onto the free pages found in step S304. Then, the process advances to step S310, where CPU-B 202 returns from the page fault interrupt 1311. In step S311, CPU-B 202 can now execute the intended part of the program.

As described above, according to the present embodiment, part of a program is copied in advance from a secondary storage device to the main storage device (DRAM). When page swapping is required, the system performs the page swapping based on operation mode: swaps out pages using the programs copied to the main storage device during "startup or exit from power-saving mode", or swaps in pages from the secondary storage device in "normal operation". Consequently, during startup or exit from power-saving mode, it is possible to start up quickly from the main storage device which allows high-speed random access. Also, in normal operation, since pages are swapped in from the secondary storage device, programs can be deleted from the main storage device. This eliminates the disadvantage of reduction in the free space of the main storage device available to the system.

Furthermore, in a system with two or more CPUs, after a light OS is started, the system waits for a heavy OS to complete startup. During the wait, a program for the heavy OS is loaded from the secondary storage device into the main storage device. This further reduces the startup time of the heavy OS.

Other Embodiments

An embodiment of the present invention has been described in detail above. The present invention may be applied either to a system consisting of multiple apparatus or to equipment consisting of a single apparatus.

Incidentally, the present invention can also be achieved by a configuration in which a software program that implements the functions of the embodiment described above is supplied to a system or apparatus either directly or remotely and a computer in the system or apparatus reads out and executes the supplied program. In that case, the present invention does not need to take the form of a program as long as it has program functions.

Thus, program code itself installed on the computer to implement functions and processes of the present invention on the computer also implements the present invention. That is, the computer program itself which implements the functions and processes of the present invention is also included in the scope of the present invention. In that case, the program code may take any form including object code, programs executed by an interpreter, and script data supplied to an OS as long as it has program functions.

Examples of a recording medium used to supply the program include, a floppy (registered trademark) disk, hard disk, optical disk, magneto-optical (MO) disk, CD-ROM, CD-R, CD-RW, magnetic tape, non-volatile memory card, ROM, and DVD (DVD-ROM and DVD-R).

Besides, the program can also be supplied via an Internet homepage. In that case, the user is supposed to connect to the Internet homepage using a browser on a client computer and download the computer program of the present invention onto a recording medium such as a hard disk. The computer program may be downloaded as it is or as a compressed self-installing file. Also, the program code of the program according to the present invention may be divided into multiple files, which can be downloaded from respective homepages. That is, the present invention also includes WWW servers which allow multiple users to download program files capable of implementing the functions and processes of the present invention on a computer.

The present invention may also be distributed to users as a storage medium such as a CD-ROM containing the program of the present invention in encrypted form. In that case, only the users who satisfy predetermined conditions are provided with key information for decryption through a download from an Internet homepage and allowed to decrypt and install the program in executable form on a computer using the key information.

The functions of the above embodiment may be implemented not only by the program read out and executed by the computer, but also in conjunction with an OS or the like running on the computer. In that case, the functions of the above embodiment are implemented by part or all of the actual processing executed by the OS or the like in accordance with instructions from the program.

Furthermore, the functions of the above embodiment may also be implemented by part or all of the actual processing executed by a CPU or the like contained in a function expansion board inserted into the computer or a function expansion unit connected to the computer if the processing is performed in accordance with instructions from the program that has been read out of the recording medium and written into memory on the function expansion board or unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2007-264971, filed Oct. 10, 2007, which is hereby incorporated by reference herein in its entirety.

What is claimed is:

1. An information processing apparatus having a first storage unit and a second storage unit, comprising:
   a first processing unit configured to execute a first OS stored in said first storage unit;
   a second processing unit configured to execute a second OS stored in said second storage unit; and
   a third storage unit configured to store a program to be executed on the second OS,
   wherein said first processing unit loads the program to be executed on the second OS from said third storage unit into the first storage unit, and
   said second processing unit causes the second OS to execute the program loaded in the first storage unit.

2. The apparatus according to claim 1, wherein the first OS is stored in a fourth storage unit, and said first processing unit loads the first OS from said fourth storage unit into the first storage unit.

3. The apparatus according to claim 1, wherein after loading the program to be executed on the second OS into the first storage unit, said first processing unit notifies said second processing unit of an address of the first storage unit in which the program to be executed on the second OS is stored.

4. The apparatus according to claim 1, further comprising:
   a determination unit configured to determine at least whether or not the second OS is starting up, if a page fault occurs as a result of an attempt to access to a part of the program to be executed on the second OS during execution of the program to be executed on the second OS; and
   a control unit configured to execute a page-in process by copying the part of the program to be executed on the second OS to a second memory area of the first storage unit, wherein the part of the program was copied from said third storage to a first memory area of the first storage unit, if said determination unit determines that the second OS is starting up, and
   to execute the page-in process by copying the part of the program to be executed on the second OS, stored in said third storage unit, to the second memory area, if said determination unit determines that the second OS is not starting up.

5. The apparatus according to claim 4, wherein said determination unit further determines whether or not the information processing apparatus is exiting from power-saving mode; and
   said control unit performs the page-in process by copying the part of the program to be executed on the second OS to the second memory area, wherein the part of program is copied in the first memory area, if said determination unit determines that the information processing apparatus is exiting from the power-saving mode.

6. The apparatus according to claim 4, wherein the second memory area is a physical memory and the page fault occurs if pages in the physical memory have not been mapped to pages in a virtual memory when said second processing unit accesses the pages in the virtual memory.

7. The apparatus according to claim 1, wherein said third storage unit stores a program to be executed on the first OS;
   said first processing unit loads the program to be executed on the first OS from said third storage unit into the first storage unit; and
   said first processing unit causes the first OS to execute the program to be executed on the first OS, with the program loaded in the first storage unit.

8. A control method for an information processing apparatus having at least a first processing unit and a second processing unit and a first storage unit and a second storage unit, comprising the steps of:
   causing the first processing unit to execute a first OS stored in the first storage unit;
   causing the second processing unit to execute a second OS stored in the second storage unit;
   causing the first processing unit to load a program to be executed on the second OS from a third storage unit into the first storage unit; and
   causing the second OS, via the second processing unit, to execute the program to be executed on the second OS, with the program loaded in the first storage unit.

9. The method according to claim 8, wherein the first OS is stored in a fourth storage unit, and the first processing unit loads the first OS from the fourth storage unit into the first storage unit.

10. The method according to claim 8, wherein after loading the program to be executed on the second OS into the first storage unit, the first processing unit notifies the second processing unit of an address of the first storage unit in which the program to be executed by the second OS is stored.

11. The method according to claim 8, further comprising:
    a determination step of determining at least whether or not the second OS is starting up, if a page fault occurs as a result of an attempt to access to a part of the program to be executed on the second OS during execution of the program to be executed on the second OS; and
    a control step of executing a page-in process by copying a part of the program to be executed on the second OS to a second memory area of the first storage unit, wherein the part of the program is copied from the third storage unit to a first memory area of the first storage unit, if it is determined in said determining step that the second OS is starting up, and
    executing the page-in process by copying the part of the program to be executed on the second OS to the second memory area from said third storage unit, if it is determined in said determining step that the second OS is not starting up.

12. The method according to claim 11, wherein said determination step determines whether or not the information processing apparatus is exiting from a power-saving mode; and said control step performs the page-in process by copying the part of the program to be executed on the second OS to the second memory area from the first memory area to which the part of the program has been copied, if it is determined in said determining step that the information processing apparatus is exiting from power-saving mode.

13. The method according to claim 11, wherein the second memory area is a physical memory and the page fault occurs if pages in the physical memory have not been mapped to pages in a virtual memory when the second processing unit accesses the pages in the virtual memory.

14. The method according to claim 8, wherein the third storage unit stores a program to be executed on the first OS, the control method further comprising the steps of:

causing the first processing unit to load the program to be executed on the first OS from the third storage unit into the first storage unit; and causing the first OS, via the first processing unit, to execute the program to be executed on the first OS, with the program loaded in the first storage unit.

* * * * *